July 10, 1945.  G. A. McBRIDE  2,380,252
TREATMENT OF PAPER MACHINE WASTE WATER
Filed Oct. 31, 1942
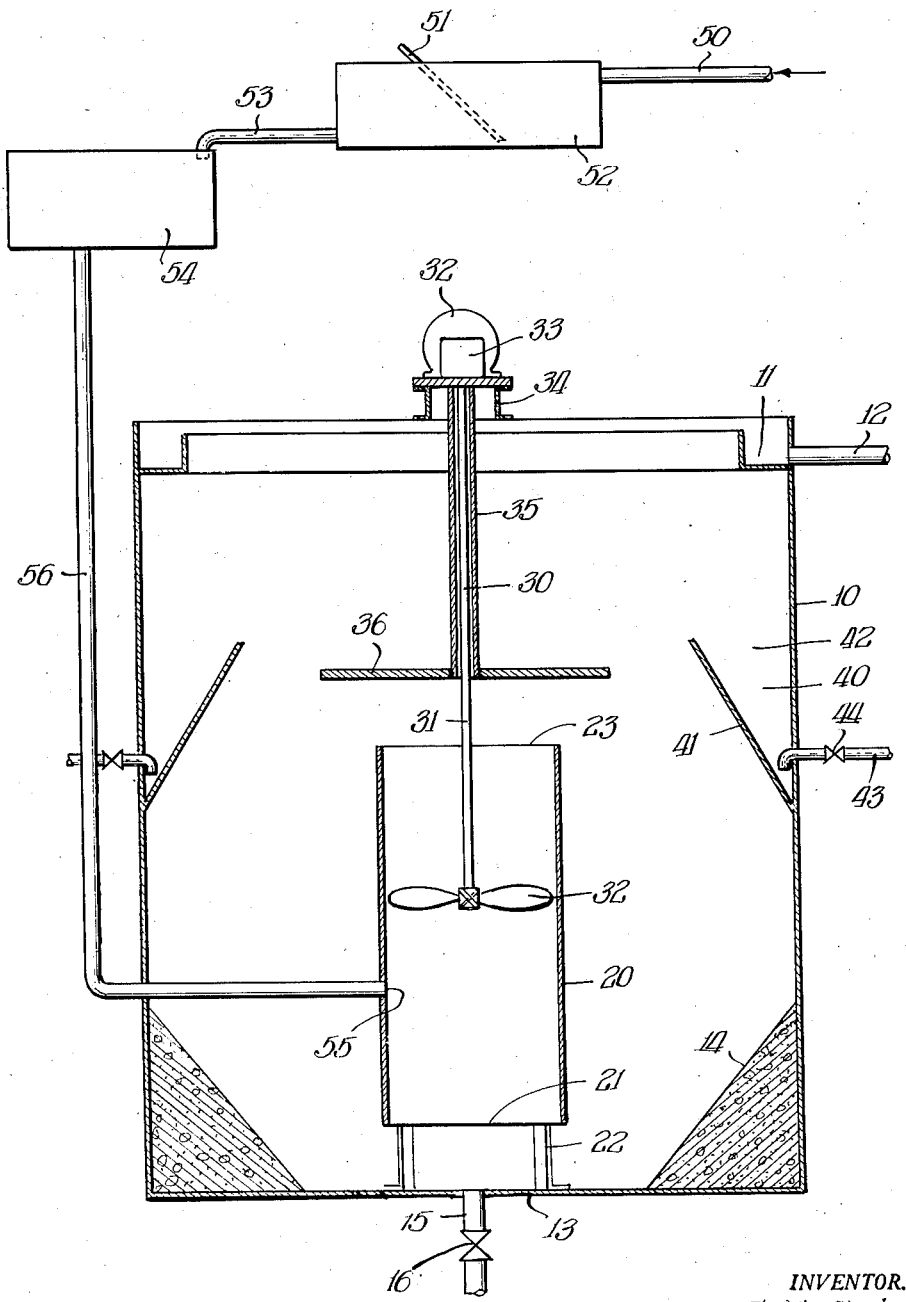
INVENTOR.
George A. McBride,
BY Robyn Hilcox
ATTY.

Patented July 10, 1945

2,380,252

UNITED STATES PATENT OFFICE 2,380,252

TREATMENT OF PAPER MACHINE WASTE WATER

George A. McBride, Grosse Pointe Woods, Mich., assignor to Infilco Incorporated, Chicago, Ill., a corporation of Delaware Application October 31, 1942, Serial No. 464,138

9 Claims. (Cl. 210—16)

This invention relates to the separation of fibrous material from thin suspensions thereof, such as from paper machine white water or the like.

One of the principal objects of this invention is the recovery of fibrous material from waters such as from paper mill waste water, by a process involving only physical means as distinguished from those requiring the use of chemicals.

A further object of this invention is the removal of fibrous material from paper mill waste water without the use of a chemical coagulant.

Another object of this invention is the treatment of paper machine waste water to remove suspended solids therefrom and to render the water suitable for discharge into water courses.

These, and other objects, will be apparent from the specification and claims which follow. The process will be described in connection with the separation of fibers from paper machine waste water, but it will be apparent that the process is equally applicable to the removal of other fibrous material from thin suspensions thereof.

It is well known that waste water from a paper manufacturing plant contains a large amount of fine suspended fibers, which are extremely difficult to remove from the water in which they are contained. In early days the waste water usually was discharged directly into a water course, which would carry away the waste material. However, the fiber contained in the waste water injured fish life and in many ways polluted the water in the stream. The nuisance created by this means of disposal has been such that in most communities the practice was prohibited. Several methods have been used to meet this situation: One of the oldest has been to pass the waste water into a lagoon where the water is held for a prolonged time, the water eventually draining off and leaving the fibrous material behind. This creates an objectionable condition and in many localities cannot be used. Plain settling or sedimentation tanks also have been used, such as large clarifiers of well known design, in which the waste water is held for a prolonged period, during which a portion of the fibers settle to the bottom and are removed to waste while partially clarified liquid is drawn from the upper portion of the chamber. Such clarifiers are extremely expensive to construct, as the amount of water to be treated is very great and the holding time must be quite long. They also are not entirely satisfactory as only a portion, such as one-half or two-thirds, of the fibrous material will be removed in this way. In some instances the clarification chambers or settling tanks are used in conjunction with chemical flocculation of the waste water. This requires the addition of a large amount of coagulant to the water and additional equipment to provide for the gentle and thorough mixing of the chemical reagent with the waste water. This practice has not been satisfactory in view of the expense involved in the purchase of the chemical needed for coagulation. The water leaving the paper machine is usually passed through a device called a "save-all" that may be a form of screen or may be of some other type for the purpose of catching and returning to the process as much of the fibrous material as possible. However, a portion of the fiber, and particularly of the shorter fiber, passes through such devices and is found in the waste water. These fibers can be removed by filtration but because of the large quantities of water involved the required filters are large and expensive and for this reason, and because of the troublesome nature of the mat formed on them require considerable labor and attention. One of the objects of my invention, therefore, is to provide a process capable of removing the fibrous material in such waste water, without use of a coagulant, and in and by apparatus requiring little attention.

I have found that fibrous material can be removed from such paper mill waste water much more efficiently by my new process, which requires relatively small separation or recovery plants, avoids the use of expensive chemicals, and produces a satisfactory effluent. Briefly, my process comprises the establishment and maintenance of a floating blanket of filtering material in the form of a thickened suspension of more or less interlaced fibrous material; incorporating the newly entering fiber-bearing water into this suspension so that the entering fibers are entangled in or retained by and in the suspension, so as to be added to and become part of the floating filter blanket. The filtered water is allowed to exude out of this floating filter blanket at a rate such that the fibers will be retained by the blanket, and as fibers accumulate in the floating blanket, and to prevent this becoming too thick or dense, fibers are withdrawn from it to disposal in some suitable manner. I have found that the density of this filter blanket can vary over quite a wide range and still good results be had so far as removal of fibers from the water is concerned, although there is probably some relation between this density and the nature of the fiber, the quantity of fiber in the entering water and the volume of the filter blanket. The minimum density apparently may be only a few hundred parts per million while the maximum density may be anything up to that where troubles develop in handling it or in removing fibers from it. The volume of the suspended filter bed may also vary over wide limits, there being no upper limit so far as securing results is concerned although of course results are not materially improved beyond a certain point and an unduly large apparatus incurs extra and unnecessary cost. In general good results can be had where the volume of this suspended blanket is such that the entering water will be incorporated in a volume of filtering medium of from five to twenty-five times its own bulk; that is, in general, the volume of the suspended blanket should be of from five to twenty-five times the volume of water entering per minute to be clarified. Thus the water can be purified from fiber in my suspended filter in from about five to twenty-five minutes as against a period of several hours required for sedimentation, with corresponding saving in size of clarifying tanks.

My process can be carried out in a wide variety of forms of apparatus. All that is vitally necessary is that there be means for thoroughly mixing or incorporating the entering water with the necessary volume of suspended filter, that this filter or the fibers thereof be kept in fairly uniform suspension, that there be a place or surface of little or slow motion where clarified water may escape and that there be some way of taking away fibers as necessary to prevent the suspension becoming too thick.

In the accompanying figure I have shown a simple form of apparatus suitable for my purposes, but as mentioned above various forms of apparatus may be used. Thus, those forms of apparatus used for the treatment of water by contact with a suspended sludge or slurry may be used, such as that shown in Green, Re. No. 22,194, or Spaulding, No. 2,021,672, or Hughes, No. 2,245,588. It should be noted, however, that while the apparatus of those patents may be used for carrying out my process because they provide means for keeping the fibers in suspension and a place for clarification as I require, yet I do not contemplate the precipitation or chemical step that is an essential part of the processes for which each of those apparatus has been proposed. Also in the processes and the apparatus of those patents, it is contemplated to get a completely clarified treated water whereas I do not necessarily contemplate this. My process is directed to the removal of the fibrous material and if the water contains other material, such as color or minerals in suspension, while some of this may be retained, a major portion will pass on and out with the effluent which may be quite turbid. It will thus be seen that I am proposing a process that is selective as to the material to be removed or retained.

Thus, from one aspect my process may be regarded as a thickening process, i. e., one in which the fibers present in a very dilute suspension thereof (the amount of fiber in a mill waste water may be under one part in ten thousand), are retained and accumulated as particles of interlaced fibers to form a suspension of some predetermined or desired consistency and then discharged, the only means used to effect the intended thickening being such interweaving of the fibers. Thus in one case I was able to take the waste water from a mill where it had been subjected to the usual save-all processes but which still contained an objectionable amount of fiber, and by my process furnish on the one hand an effluent of quality that it could be discharged into an adjacent fish stream and on the other hand a discharge of thickened fiber of such small volume that it could have been sent to waste in an available lagoon, but which was of such quality that it also could be returned to the mill for use. Such fiber was easily recoverable, and due to the fact that it was not adulterated by a coagulant, was suitable for use.

The process will be more fully understood by reference to the drawing which illustrates a vertical, cross-sectional view of a preferred type of apparatus suitable for the practice of my invention.

The treatment apparatus comprises a tank 10 of any suitable size and shape although a cylindrical tank will ordinarily be preferred. A launder 11 communicating with a treated water outlet 12 is provided in the upper portion of the tank, preferably adjacent the top edge thereof. The floor 13 of the tank may be substantially horizontal in the center, although it is preferred that the outer edges thereof be steeply sloping, as shown by the concrete fill 14 to prevent the sedimentation of particles in the corner of the tank. A drain 15 placed in the floor 13 of the tank, and provided with suitable valve means 16 permits the emptying of the entire apparatus if desired.

A vertical mixing chamber 20 is centrally placed in the lower portion of the tank. The lower end of the mixing chamber 20 is open and terminates, as at 21, in a plane spaced from the floor 13 of the tank, and is held in such spaced relationship by any suitable means such as legs 22. The upper end of the mixing chamber 20 terminates, as at 23, in a plane substantially below the liquid level of the tank, which is established by the launder 11.

Within the mixing zone 20 I provide a mixing and propelling means, generally designated by 30. The mixing and propelling mechanism 30 comprises a shaft 31 axially aligned in the mixing chamber 20 provided with a liquid propelling and mixing means, such as a propeller 32. The shaft 31 is rotated by any suitable means such as an electric motor 32 operating through speed reducer 33 supported above the tank in any suitable manner, as by beams 34. It is preferred that the propeller 32 be of such size and so constructed as to provide a turbulent mixing within the mixing chamber 20 and an upward flow of liquid therethrough. It is desirable that the upper part of the shaft 31 be encased in a protecting tube 35 so that its rotation will not cause any disturbance in the water in the upper portion of the tank. It is necessary to provide a deflecting means, such as horizontally extending baffle, or plate 36 above the upper end 23 of the mixing chamber 20 so that liquid issuing therefrom will be deflected laterally to avoid disturbance of the water in the upper portion of the tank.

Excess solids must be removed from the thickened suspension which forms a body or pool in the lower portion of the tank 10. This is preferably accomplished by means of solids separators or concentrating chambers 40. The concentrators may be of many sizes and shapes, but for purposes of illustration, are shown as formed by sloping, chordal partitions 41 attached to the wall of the tank 10. The concentrating pockets 40 are open at the top, as at 42, and rise to an elevation preferably slightly above that of the deflecting baffle 36. A solids outlet 43 provided with a control valve 44 leads from the lowermost portion of each concentrating chamber 40 to remove deposited solids.

Untreated paper mill waste water to be clarified can be introduced by any suitable means, as by pipe 50, leading from the paper machines or other equipment in the paper mill, not shown. It is preferred, however, that the waste water be passed through a coarse screen, such as a bar screen 51, interposed across the flow of waste water, as in screen box 52, in order to remove large pieces of material such as rags, large sheets of paper, string, etc. which tend to interfere with the process and foul the equipment. Following rough screening through the bar screen 51 the waste water may be passed through a suitable conduit such as pipe 53 into a constant head box 54 and is then passed through a feed pipe 56 to an inlet 55 discharging into the mixing zone 20. The operation of a constant head box is well understood by those familiar with the art and is designed to maintain a constant head of water in the inlet, or feed, pipe 56, so that waste water will be introduced at a uniform rate. Introduction at a uniform rate is desirable as better results are secured when the flow of waste water is at a constant flow rate. It is preferred that the waste water be introduced into the lower portion of the mixing chamber 20 as shown.

The operation of the process is as follows: Waste water from the paper mill is introduced through pipe 50 and passed through a coarse screen 51 to remove rags, large pieces of paper, etc. which might foul the mixing and agitating mechanism 30, then to the constant head box 54 placed above the treating tank 10. From the constant head box 54 the white water passes through the inlet conduit 56 by gravity and is discharged, as at 55, into the lower portion of the mixing chamber 20. The mixing and circulating mechanism 30 is rotated at a relatively high speed to provide a somewhat rapid dispersal of the waste water throughout the accumulated suspension in the lower portion of the tank. The apparatus should be so designed as to provide for a volume of thickened suspension of, preferably, five to twenty-five times the amount of inflow of waste water per minute, although larger volumes of thickened suspension can be used without detrimental effect on the process. The mixture of thickened suspension and raw waste water passes upwardly through the mixing chamber 20 and out through the upper end 23 thereof. The mixture, which by this time is a uniform and partially thickened suspension, though of course somewhat thinner than that entering the inlet end 21, is deflected laterally by the deflecting baffle 36. As will be apparent from the above description and the drawing, the mixture leaving the top of the mixing chamber 20 spreads outwardly and slows down as it flows laterally from the mixing chamber toward the walls of the tank. This lateral flow, therefore, will be relatively quiescent as compared to the mixing zone, although obviously it cannot be completely quiescent as the flow is of considerable volume. A major portion of this lateral flow will turn downwardly and return to the lower end of the mixing chamber 20 for admixture with newly entering water. An output portion of water, equal to the input of water to be treated, will rise from the lateral flow. The fiber-free water will escape from the suspension and will rise further to be withdrawn over launder 11 while the excess fibers from the suspension will deposit in the pocket 40 for concentration and discharge to waste. The zone in which the water separates from the matted fibers is not necessarily quiescent, as in my process fiber-free water readily escapes from the filter media, even from a large but non-turbulent flow of such media. Thus I have two zones in my suspension of thickened fibers: a zone of turbulent mixing of the fiber-containing water and the thickened suspension of previously accumulated fibers; and a zone of relative quiescence in which fiber-free water separates from the suspension. If desired, stilling baffles, not shown, can be put in the lateral flow space or space in the separation zone to still agitation or turbulence in the outward flow. Ordinarily, however, such baffles will not be necessary.

It has been found that the thorough mixing and circulation of the raw waste water with the circulating thickened suspension results in entrapment and retention of the fibrous material in the waste water, with resultant growth of the flock-like tufts of interlaced or tangled fibers. The passing of the raw waste water into the circulating thickened suspension has the effect of passing it through a filter, as the fine fibrous material is filtered out. It does not have the disadvantage of mechanical filters as there is no clogging of the filter. In effect, there is a continuous addition of waste water to the suspended filter, a continuous building up of the filtering medium accompanied by a gradual movement of the filtering medium to the point of discharge, and a continuous removal of excess filtering medium at the rate of formation of new filtering medium. The circulation, or agitation, spoken of herein need be only sufficient to maintain the tufts of interlaced fibers in suspension and to thoroughly disperse the raw waste water throughout the filtering mass. It is obvious that the mere passage of such raw waste water through such a suspended filtering mass, without preliminary mixing therein, would not remove all of the fibers from the raw water, but uniformly dispersing the raw water throughout, and mixing it with, the filtering medium produces very different results. For this reason, therefore, it is necessary to continuously agitate the entering raw water with the thickened suspension and desirably to circulate the suspension in such a manner as to continuously present new filtering material to the entering raw water.

At the beginning of operation of my process there is, of course, no preformed body of filtering medium, so that for a period the fibers are only partially removed. However, the rapid dispersal of entering raw water in the water in the tank provides for the tangling and interlacing of the fibers, secured by the agitation and circulation above mentioned, so that gradually a relatively large mass of tuft-like clusters of interlaced fibers is accumulated. Thereafter, upon introducing the raw untreated waste water into such a body of suspended filtering material, there is a mutual inter-attraction which results in the retention and entrapment of the smaller newly entering fibers by the particles of interlaced fibers which have been formed. In this connection it might be mentioned that much of the value of the fibrous tufts is lost if they are permitted to deposit and are then resuspended. So long as the fibers are properly matted by the continuous agitation of my process they develop into masses that are denser and heavier than flocs formed by simple flocculation of white water. If the suspension of my process were passed into a sedimentation chamber it would be found that part of the fibrous matter would settle very rapidly but not the newly entering fine fibers. However, in my process it is desired to avoid sedimentation of any portion of the suspension, except that removed to waste, so as to secure the necessary entrapment of the newly entering fibers.

Preferably excess fibers are removed by some concentrating means, such as the concentrating chamber 40, which in size are strikingly small in contrast to the old type of separator or clarifying basin. The concentrators may be of any suitable design. The valve 44 on the sludge outlet 43 is so operated as to remove sedimented solids at approximately the rate of formation. This results in the discharge of a sludge extremely concentrated as to fibrous content. Such fibrous material, having had no chemicals or coagulants added thereto during the process of removal, are suitable for use in the paper mill. Such recovery is not practical in the ordinary treatment by floculation with a chemical reagent.

It will be understood from the above description that clarification of the waste water is not secured by sedimentation or settling but by a continuous filtering of the solids from the water in which they are contained. It is desirable in my process to maintain the suspended filtering medium at a relatively uniform concentration, removing solids at approximately the rate of formation.

It will also be understood that the term "clarified water" used herein is intended to refer to a substantially fiber-free water. The present process is not primarily designed to remove color or dissolved or colloidal matter, although in some instances some such matter may be adsorbed by the fibrous material, so that for the purposes of this invention the water can be considered as clarified if the fibers are substantially removed.

Obviously many modifications and variations of the invention hereinbefore set forth may be made without departing from the spirit and scope thereof, the reference to paper machine white water being used for purposes of illustration rather than as a limitation of the invention.

I claim:

1. A process of mechanically recovering fibers from a suspension thereof, and without addition of a chemically reacting reagent thereto, which comprises maintaining a body of liquid undergoing treatment, said body of liquid being functionally divided into a lower agitated zone containing a thickened suspension of similar fibers accumulated from previously treated suspension and a superposed quiescent clarified liquid zone, passing entering liquid containing fibers through said zone containing a thickened suspension of similar fibers, continuously agitating the contents of said last mentioned zone so that newly entering fibrous suspension is mixed through and incorporated in the thickened suspension, whereby newly entering fibers are entrapped by and retained within said thickened suspension, withdrawing clarified liquid from the upper surface of said thickened suspension into said clarified liquid zone, and withdrawing liquid containing fibers from said thickened suspension to control the accumulation of fibers therein.

2. A process of removing fibrous material from an aqueous suspension thereof without addition of a precipitating reagent thereto which comprises maintaining a body of water undergoing treatment, maintaining a relatively large body of a thickened suspension of similar fibers accumulated from previously treated water in the lower part of said body of water, said thickened suspension having an upper escape surface below the surface of said body of water, maintaining a quiescent body of clarified water superposed on said escape surface, delivering suspension to be treated into said body of thickened suspension, continuously agitating and circulating the contents of said body of thickened suspension so that newly entering fibrous suspension is uniformly mixed through and incorporated in the thickened suspension, whereby the entering suspension is filtered in and through said thickened suspension and newly entering fibers are entrapped and retained in said thickened suspension and become a part thereof, exuding clarified water from said suspension through said escape surface upwardly into said superposed quiescent body of clarified water, withdrawing clarified water from said superposed quiescent body of clarified water, and withdrawing liquid containing fibers from said thickened suspension to control the accumulation of fibers therein.

3. A process of mechanically separating fibrous material from an aqueous suspension thereof without addition of a precipitating reagent which comprises maintaining a body of liquid undergoing treatment, establishing a suspended filtering medium in the form of a thickened suspension of fibrous material accumulated from previously treated suspension in the lower portion of said body of liquid, the volume of said suspended filtering medium being several times greater than the normal volume of suspension to be treated per minute, circulating said suspended filtering medium through a cyclic path which includes a mixing zone and a relatively quiescent zone, passing incoming fibrous suspension into said mixing zone and mixing the same in and through said suspended filtering medium, displacing clarified water from the upper surface of said filtering medium in said relatively quiescent zone into a clarified liquid zone in the upper part of said body of liquid undergoing treatment, and continuously withdrawing excess fibers from said filtering medium.

4. A process of recovering fibrous material from paper machine waste water without the addition of chemical coagulant which comprises establishing in a body of water undergoing treatment a lower zone containing a suspended filtering medium in the form of a thickened suspension of fibrous material accumulated from previously treated waste water and an upper quiescent zone containing clarified water, said zones adjoining at an escape surface, passing incoming waste water into one portion of said filtering medium, agitating together the filtering medium and entering waste water in said portion, whereby the fibrous material in said incoming waste water is entrapped by said filtering medium, passing the mixture of filtering medium and entrapped fibers to adjacent said escape surface, displacing an output quantity of clarified water from said mixture through said escape surface into said quiescent zone, withdrawing clarified water from the upper level of said body of water, returning suspended filtering medium to said one portion for further entrapment of fiber, and removing fibrous material from said filtering medium at a rate corresponding to the rate of addition thereto.

5. A process of recovering fibrous material from paper machine waste water without the addition of chemical coagulant which comprises establishing and maintaining in the lower portion of a body of water undergoing treatment a circulation and agitation zone and in the upper portion of said body a quiescent clarified water zone, accumulating in said circulation and agitation zone a suspended filtering medium in the form of a thickened suspension of fibrous material accumulated from previously treated waste water, introducing waste water into one portion of said filtering medium removed from said clarified water zone, agitatively mixing the waste water in and with filtering medium in said portion, whereby the incoming fibrous material is entrapped by said filtering medium, simultaneously exuding an output quantity of substantially fiber-free water from said circulation and agitation zone into a lower portion of said clarified water zone, withdrawing fiber-free water from the upper portion of said clarified water zone, and removing fibers from said filtering medium at a rate corresponding to the rate of addition thereto.

6. The process of claim 5 wherein the quantity of suspended filter medium is of the order of at least five times the quantity of waste water introduced per minute.

7. A process for removing fibers from liquid containing same without addition of a precipitating reagent thereto comprising establishing and maintaining a suspension of accumulated fibers, continuously introducing fiber containing liquid into one zone of said suspension and incorporating the same therein, whereby newly entering fibers are distributed through and become interlaced with fibers accumulated in said suspension and so become a part of said suspension, continuously displacing fiber-free liquid from another and quiescent zone of said suspension into a superposed quiescent body of clarified liquid, continuously circulating the contents of said suspension through said zones, and continuously withdrawing fibers from said suspension through a thickening zone at a rate equivalent to the rate of entry thereof.

8. A process for recovering fibrous material from paper machine waste water without addition of a chemical coagulant which comprises maintaining a body of waste water undergoing treatment, maintaining a thickened suspension of fibrous material accumulated from previously treated waste water in the lower portion of said body of waste water, said thickened suspension having an upper escape surface below the surface of the body of waste water undergoing treatment, circulating said suspension upwardly in one portion thereof, deflecting said upward flow horizontally adjacent said escape surface, and then returning said flow downwardly into said suspension, displacing clarified water upwardly from said horizontal flow through said escape surface, withdrawing clarified water from the upper part of said body of water above said escape surface, delivering incoming waste water into said suspension in the path of said circulation, whereby the fibrous material in said incoming waste water is entrapped in said thickened suspension, and removing fibrous material from said thickened suspension at a rate corresponding to the rate of addition of fibrous material thereto.

9. In a process of mechanically recovering fibrous material from paper machine waste water, the steps of maintaining a body of waste water undergoing treatment, said body of waste water comprising a lower zone containing a thickened suspension of such fibrous material accumulated from previously treated waste water, a superposed quiescent zone containing clarified water, and a relatively quiescent horizontal clear water escape surface between said zones, the volume of said thickened suspension of fibrous material in said first zone being several times greater than the normal volume of waste water to be treated per minute, turbulently mixing incoming waste water to be treated with a larger volume of said thickened suspension in a confined mixing zone removed from said escape surface, whereby the fibrous material in said waste water is entrapped in said thickened suspension, passing said suspension from said mixing zone to said escape surface, withdrawing clarified water upwardly from said escape surface into said clarified water zone, returning fibrous material from said escape surface to said mixing zone, and removing fibrous material from said thickened suspension at a rate corresponding to the rate of addition of fibrous material thereto.

GEORGE A. McBRIDE.